United States Patent

[11] 3,553,361

[72] Inventor Frank W. Mounts
Colts Neck, N.J.
[21] Appl. No. 820,552
[22] Filed Apr. 30, 1969
[45] Patented Jan. 5, 1971
[73] Assignee Bell Telephone Laboratories Incorporated
Murray Hill, N.J.
a corporation of New York

[54] CONDITIONAL REPLENISHMENT VIDEO SYSTEM WITH SAMPLE GROUPING
8 Claims, 3 Drawing Figs.

[52] U.S. Cl. .......... 178/7.1, 178/6. 179/15.55
[51] Int. Cl. .......... H04b 1/66
[50] Field of Search .......... 178/6BWR, 6.8; 325/38.1; 179/15.55

[56] References Cited

UNITED STATES PATENTS

| | | | |
|---|---|---|---|
| 3,185,824 | 5/1965 | Blasbalg et al. | 179/15.55 |
| 3,225,333 | 12/1965 | Unal | 179/15.55 |
| 3,378,641 | 4/1968 | Uarsos et al. | 179/15.55 |

*Primary Examiner*—Robert L. Griffin
*Assistant Examiner*—Donald E. Stout
*Attorneys*—R. J. Guenther and E. W. Adams, Jr.

ABSTRACT: A redundancy reduction system is described for processing video signals by comparing each amplitude sample derived from the video signal with a stored sample corresponding to the amplitude at the same spatial point location in a previous video frame. If a significant difference exists between the new sample and the stored sample, the amplitude for the new sample is selected for transmission to a receiving location. An address word is generated with each sample to indicate the location of that sample in a video line. The address word for a sample is transmitted with the amplitude only when the transmitted sample follows a sample which has not been selected for transmission. A flag word whose value is distinguishable from all amplitude values is transmitted to indicate the end of a run of amplitude values. A synchronization word is transmitted between the samples in adjacent video lines in order to maintain line synchronization with the receiver.

INVENTOR
F. W. MOUNTS
BY Daniel D. Dubosky
ATTORNEY

CONDITIONAL REPLENISHMENT VIDEO SYSTEM WITH SAMPLE GROUPING

BACKGROUND OF THE INVENTION

This invention relates to redundancy reduction systems, and more particularly, to a redundancy reduction system for use with video signals.

Video signals of the type generated in connection with a video telephone service tend to contain a large amount of redundancy on a frame-to-frame basis. In my copending application, Ser. No. 749,770, filed Aug. 2, 1968, a redundancy reduction system is described in which a video amplitude sample is transmitted to a receiving location only if that sample differs significantly from a corresponding stored sample having the same position in a previous video frame. In order to enable the receiver to insert the sample into the proper location in a receiver frame memory, a position or address code is transmitted along with each amplitude sample.

In my above-identified copending application, the number of bits necessary to identify the position of each amplitude sample within the video frame was reduced to the number of bits which are necessary to locate a sample within a single video line. Synchronization between transmitting and receiving locations was maintained by forcing the transmission of the first sample in each video line whether or not that sample represented a significant change in amplitude. Nevertheless, a position or address word indicating the location of each sample had to be transmitted with each of the samples in order to properly locate the sample within its video line. Even when a number of changes occurred consecutively within a video line each of the samples was accompanied by an address word to indicate its relative position.

SUMMARY OF THE INVENTION

The object of the present invention is to further reduce the number of bits which must be transmitted to indicate the position of the amplitude samples within the video frame.

This object and others are achieved in accordance with the present invention wherein a frame memory stores an entire frame of video samples corresponding to the spatial points in a video frame at which samples are taken. Each new sample from a video signal is compared with its corresponding stored sample having the same spatial position in a video frame. If the new sample and stored sample differ by more than a predetermined threshold level, an energizing signal is developed. An address generator provides a digital word for each new sample, the value of which word indicates the relative position of that sample within its video line. A group word assembler, in response to the energizing signals which are developed, couples the address word and amplitude value for a selected sample to a digital transmitter, followed by the amplitude values for all of the samples in succeeding address locations providing these succeeding samples also produce energizing signals. The group word assembler terminates transmission of the group of amplitude values by transmitting a flag word whose value is distinguishable from all amplitude values.

BRIEF DESCRIPTION OF THE DRAWINGS

The operation of the invention will be more readily understood when the following detailed description is read in conjunction with the drawing in which.

DETAILED DESCRIPTION

Figure 1:
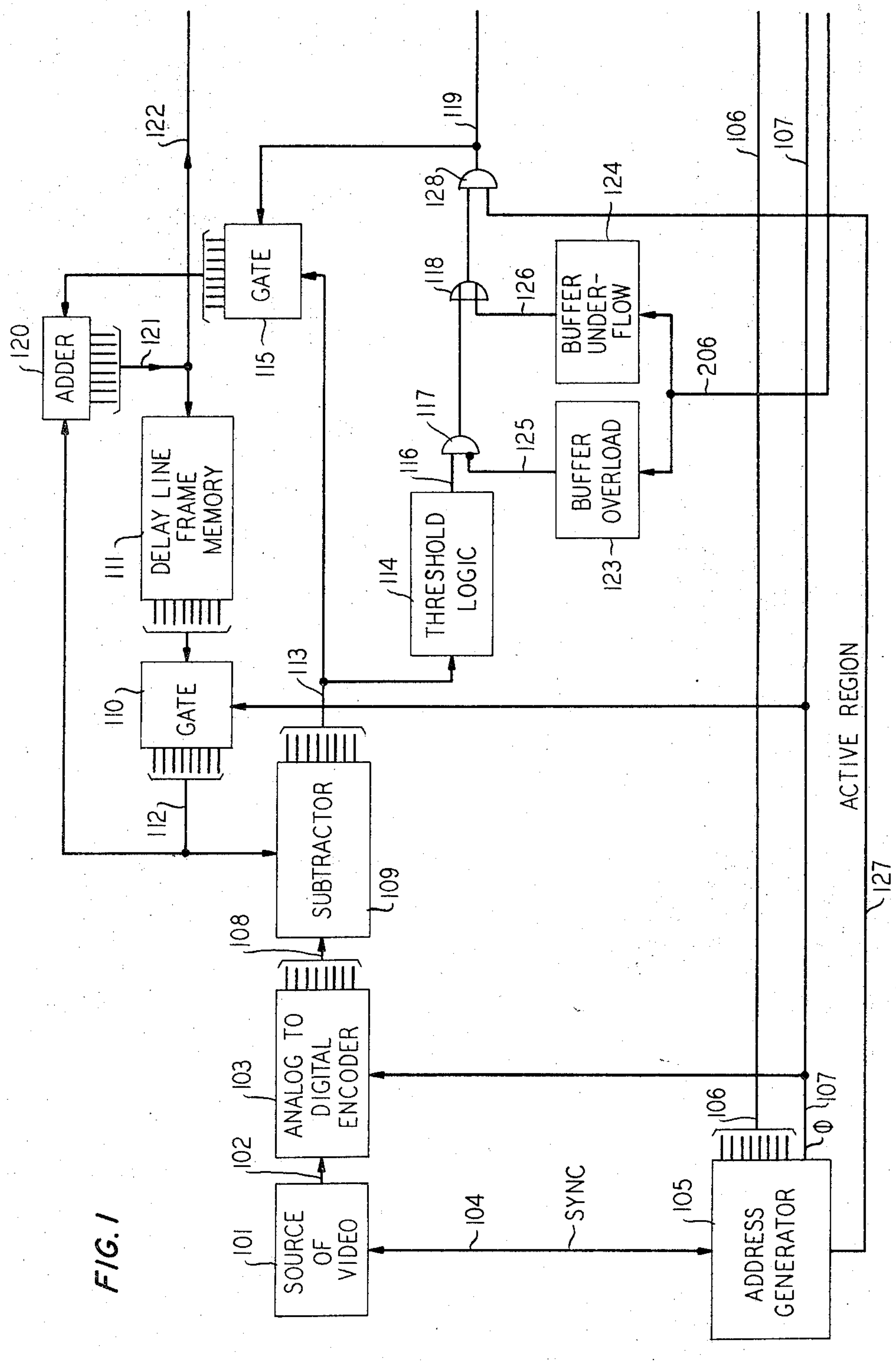
FIGS. 1 and 2, when joined by connecting the identically designated lines (with FIG. 1 to the left of FIG. 2) show a schematic block diagram of the present invention.

In FIG. 1 a source of video 101 provides a video signal on line 102 to the input of an analog-to-digital encoder 103. This video signal may be of the standard type with line information interspersed with horizontal and vertical blanking intervals. The source of video 101 may be located in a location remote from the remainder of the apparatus shown on FIG. 1, but even when this source is in a remote location, a synchronization link by way of line 104 is maintained between source 101 and an address generator 105. The synchronization provided by way of line 104 may originate in either the location of the source 101 or the location of address generator 105. Synchronization is maintained by way of line 104 such that address generator 105 provides an address digital word on bus 106 whose value designates the position along a video line of the signal value presented at the output of source 101 on line 102. Bus 106, like all of the other lines which are designated hereinafter as buses, is actually constructed of several transmission paths in parallel with one path for each bit of the digital word said to be carried by the bus. In addition, an energizing pulse is provided by address generator 105 on line 107 for each address word generated on bus 106. These pulses on line 107 are designated in the drawing as pulse train Φ and occur at a rate equal to that at which samples are to be taken of the signal on line 102 by an analog-to-digital encoder 103. In response to each pulse on line 107 analog-to-digital encoder 103 samples the video signal presented at its input on line 102 and provides a digital word at its output on bus 108 the value of which is an indication of the amplitude of the sample. Accordingly, during each line of video provided from source 101 a plurality of digital words representing the amplitudes at sampled points along the line of video are presented on bus 108 and the digital words representing the location of each of the amplitude samples on bus 108 are simultaneously provided on bus 106.

Each digital word on bus 108 is presented to one input of a subtractor circuit 109, the other input of which is connected to the output of a transmission gate circuit 110. In response to each energizing pulse in pulse train Φ on line 107, gate 110 couples the digital word presented at the output of a delay line frame memory 111 to the above-mentioned other input of subtractor circuit 109 by way of bus 112. In a manner which will be more readily apparent after an understanding of the operation of the remainder of the apparatus in FIG. 1 is obtained, delay line frame memory 111 presents a digital word at its output which represents the video amplitude for the same spatial point in a picture as that represented by the digital word on bus 108. The digital words provided by frame memory 111, however, correspond to video amplitudes which were present in the picture during a previous video frame.

The difference between the digital word on bus 108 and the digital word on bus 112 from gate 110 is provided by subtractor circuit 109 by way of bus 113 to the input of a threshold logic circuit 114 and to the input of a transmission gate 115. If this difference is greater than the predetermined threshold level built into threshold logic circuit 114, circuit 114 provides an energizing signal by way of line 116 to one input of an AND gate 117. Assuming that the inhibit input of AND gate 117 is not energized, the energizing signal developed on line 116 is coupled through AND gate 117 and then through an OR gate 118 to one input of an AND gate 128. The other input of AND gate 128 is connected by way of line 127 to address generator 105. Line 127 is provided with an energizing signal by generator 105 only during the active region of the video frame, that is, at all times except during the horizontal and vertical blanking intervals. Hence during the active region of the picture an energizing signal from OR gate 118 is coupled through AND gate 128 both to the control input of a transmission gate 115 and by way of line 119 to one input of a group word assembler 201 in FIG. 2. An energizing pulse on line 119 is designated in the drawings as representing a transmit signal, that is, a signal which indicates that an amplitude value has been selected for transmission.

With the control input of transmission gate 115 energized, the difference signal on bus 113 is coupled through gate 115 to one input of an adder circuit 120. The other input of adder circuit 120 is connected to receive the digital word provided by gate 110 on bus 112. Accordingly, the digital word developed by adder circuit 120 on bus 121 is equal in magnitude to the digital word provided on bus 108 when the transmit signal is present on line 119. When the transmit signal is not present on line 119, gate 115 is not energized, and the digital word on bus 121 is identical to the digital word on bus 112. This digital word on bus 121 is coupled to the input of delay line frame memory 111 and also by way of bus 122 to a second input of a group word assembler 201 in FIG. 2. In this way the digital words circulating in frame memory 111 are constantly updated by the most recent samples taken from the video signal on line 102 by the analog-to-digital encoder 103. It should be noted, however, that the digital word which is reinserted into frame memory 111 by adder circuit 120 is only updated, or changed, in those cases where the transmit signal is generated on line 119.

Figure 2:
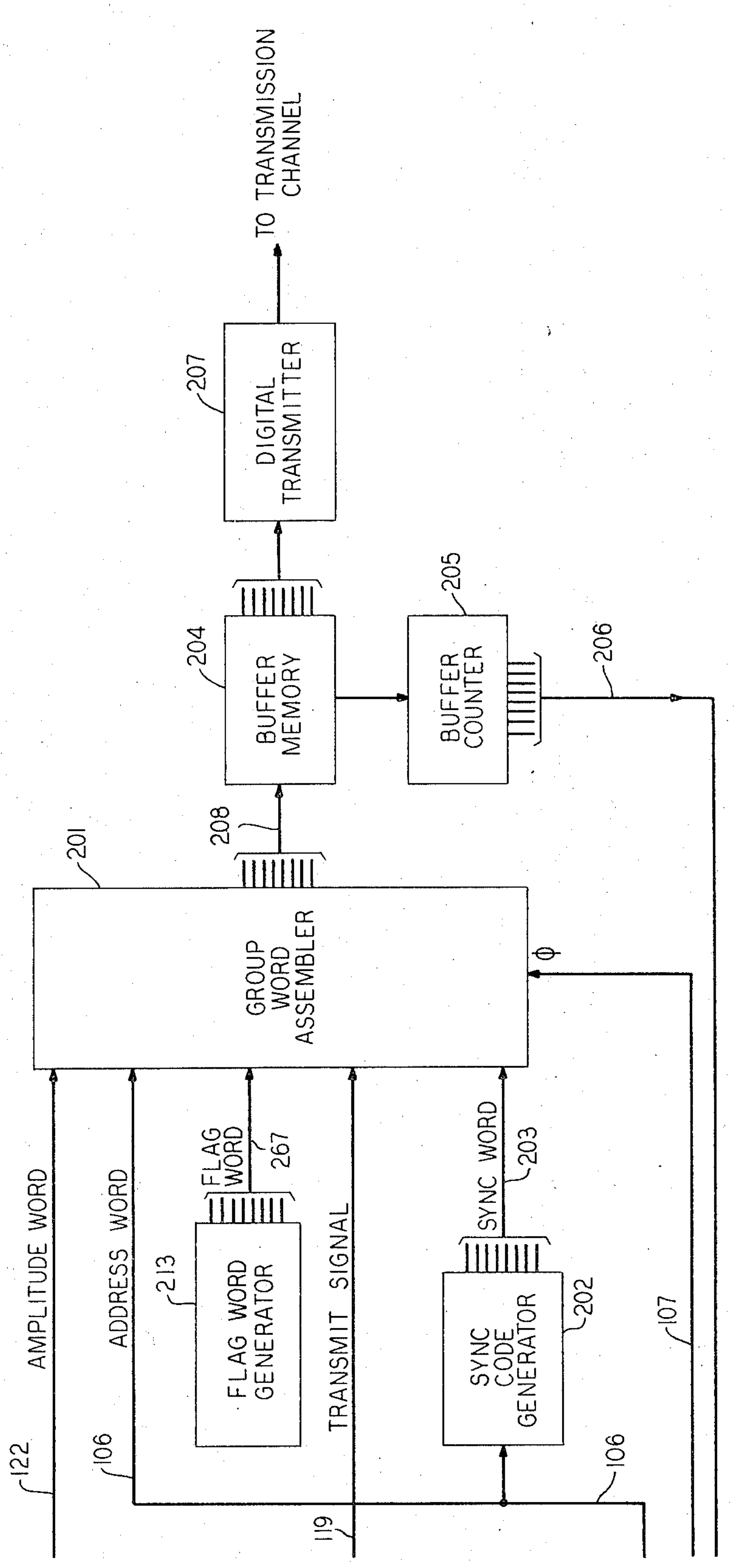

The digital words developed by address generator 105 on bus 106 are coupled to one input of the group word assembler 201 in FIG. 2 and to the input of a sync code generator 202 in FIG. 2. These digital words on bus 106 are referred to hereinafter and in FIG. 2 as address words since their values represent the position along a video line of the amplitude words presented on bus 122. If desired, each address word provided on bus 106 may designate the position of an amplitude sample or word within an entire video frame rather than its position within a single video line. For purposes of describing the present invention, however, the address word on bus 106 will be considered to designate the position of an amplitude word within a single video line only. Line synchronization is maintained with the receiver by inserting a synchronization word whose value is distinguishable from all amplitude and address words between the amplitude and address words of adjacent video lines. This synchronization word is developed by a sync word generator 202 during the horizontal blanking interval in the video signal from source 101 in response to an address word on bus 106 which represents the end of a video line. The synchronization word developed by generator 202 is coupled by way of bus 203 to one input of group word assembler 201.

Upon receiving an indication on line 119 that an amplitude value for a sample should be transmitted, group word assembler 201 couples the amplitude word on bus 122 and its corresponding address word on bus 106 to the input of buffer memory 204. If during the next sampling interval, as indicated by the next energizing pulse on line 107, a transmit signal is again present on line 119, group word assembler 201 couples the amplitude word on bus 122 through to buffer memory 204 without its accompanying address word on bus 106. For each succeeding sampling interval, as indicated by the succeeding pulses in pulse train  on line 107, group word assembler 201 will continue to couple the amplitude word only through to the input of buffer memory 204 as long as a transmit signal is present on line 119. When a sampling interval is first encountered during which a transmit signal is no longer present on line 119, group word assembler 201 connects a flag word on bus 267 from a flag word generator 213 through to the input of buffer memory 204. The values for the bits in the flag word are chosen so as to be unique and distinguishable from the digital words used to indicate amplitude and the synchronization word. In this way the receiver, upon receipt of the flag word is informed that a run of consecutive sample changes has terminated. Upon receipt of the next transmit signal on line 119, group word assembler 201 will again couple an amplitude word from bus 122 and its corresponding address word on bus 106 through to the input of buffer memory 204**.

A buffer counter circuit 205 maintains a count of the number of words stored in buffer memory 204. A digital word whose value represents this count is presented at the output of buffer counter 205 and coupled by way of bus 206 to the inputs of a buffer overload circuit 123 in FIG. 1 and a buffer underflow circuit 124 in FIG. 1. If the digital word on bus 206 indicates that buffer memory 204 is filled to within a predetermined number of words of its maximum capacity, buffer overload circuit 123 in response to this indication provides an energizing signal on line 125 to the inhibit input of AND gate 117. As a result, even though threshold logic circuit 114 may produce an energizing signal on line 116, thereby indicating that a significant change in sample amplitude has occurred, AND gate 117 is nevertheless prohibited from producing an energizing signal at its output by the energizing signal on line 125. Consequently, no transmit signal is provided on line 119 even though threshold logic circuit 114 may have determined that a significant change has taken place. In this way, group word assembler 201 is prevented from loading additional words into buffer memory 204 when buffer memory 204 is filled to within a predetermined number of words of its maximum capacity.

The cutoff of the transmit signal by gate 117 is made at a predetermined number of words less than the maximum capacity of buffer memory 204 in order to accommodate the flag word from generator 213 and words which have already been stored in the group word assembler 201. In connection with the embodiment of the group word assembler 201 to be described hereinafter as FIG. 3 this predetermined number is made equal to two.

In addition to preventing buffer memory overflow it is also desirable to maintain a predetermined number of words in buffer memory 204 at all times. This is particularly true in the present invention wherein no samples are taken of the video signal during the horizontal and vertical blanking intervals. It is accordingly desirable to maintain a sufficient number of amplitude samples in buffer memory 204 so as to be able to provide digital words at the output of the buffer memory during the entire horizontal and vertical blanking intervals. To maintain this predetermined number of words in the buffer memory, buffer underflow circuit 124 responds to any output of counter 205 on bus 206 which indicates that the number of words stored in buffer memory 204 is equal to or less than the predetermined minimum number of words. In response to such an indication on bus 206, buffer underflow circuit 124 provides an energizing signal on line 126 to one input of OR gate 118. As a result, if the underflow occurs during the active region, a transmit signal is produced on line 119 thereby indicating to the group word assembler 201 that the amplitude words on bus 122 should be coupled to buffer memory 204 even though threshold logic circuit 114 may not have indicated that a significant change has taken place. During the horizontal and vertical blanking intervals, underflow circuit 124 is not effective in producing a transmit signal on line 119 since an energizing signal is not delivered during these intervals to AND gate 128 by way of line 127.

The digital words stored in buffer memory 204 are coupled out of memory 204 on a first-in first-out basis to the input of a digital transmitter 207. Digital transmitter 207 transforms these digital words into a serial bit stream on a transmission channel in a manner well known to those skilled in the pulse code modulation art.

Figure 3:
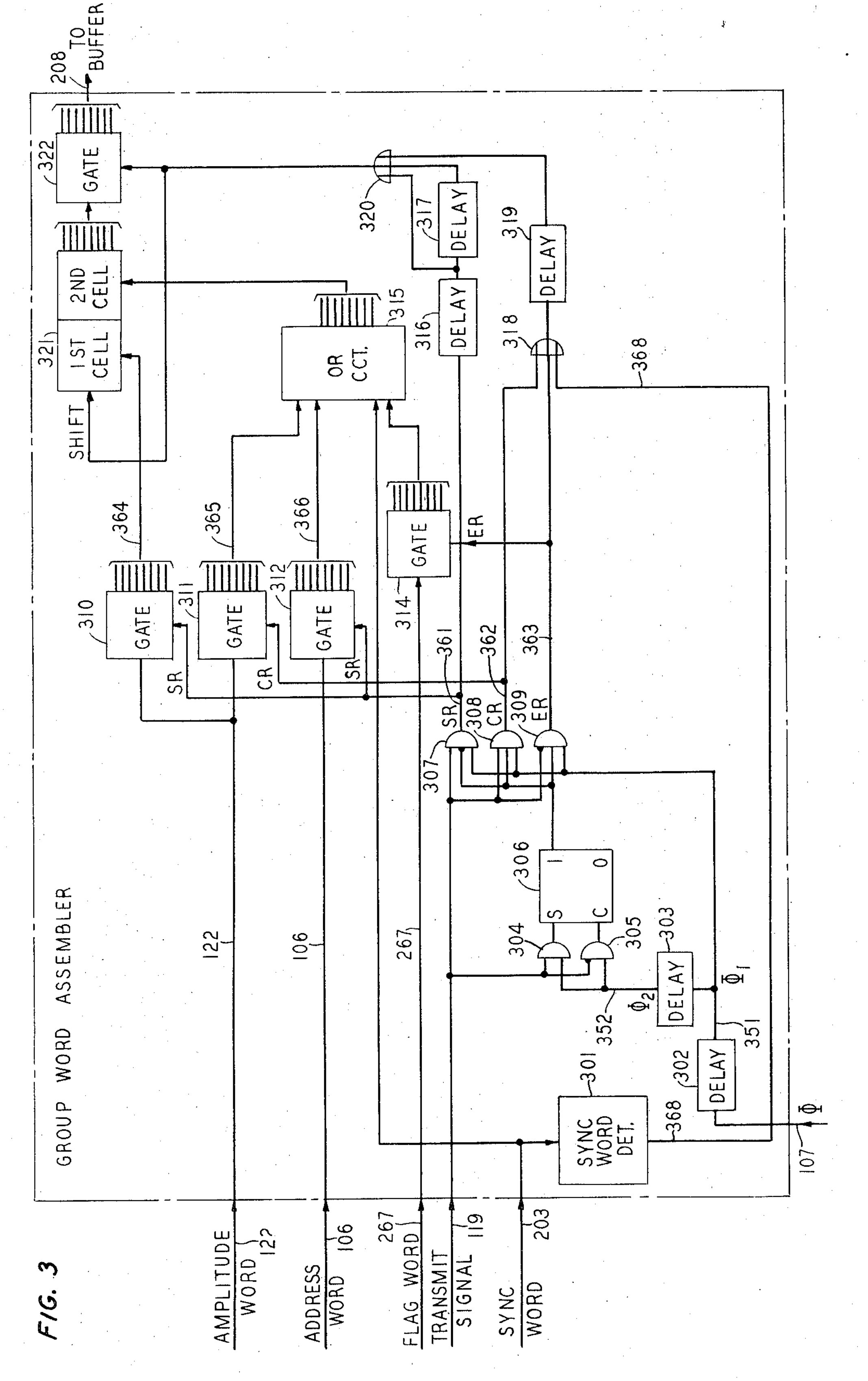
FIG. 3 is a schematic block diagram of one of the group word assemblers shown as a block in FIG. 2.

One specific embodiment of a circuit which may be utilized to provide the functions described hereinabove as performed by the group word assembler 201, is shown in FIG. 3. As pointed out hereinabove, each time that an energizing pulse in pulse train Φ appears on line 107, a sample is taken of the video signal on line 102 and the amplitude and address of that sample are presented in digital form on buses 122 and 106, respectively. In FIG. 3, each energizing pulse on line 107 is coupled through a delay circuit 302 to provide an energizing pulse on line 351, designated in FIG. 3 as belonging to pulse train $\Phi_1$. Each energizing pulse on line 351 is then coupled through a delay circuit 303 to provide an energizing pulse on line 352, designated in FIG. 3 as belonging to pulse train $\Phi_2$. The delay in circuits 302 and 303 is short enough so that the pulses appear on lines 351 and 352 before the next appearance of an energizing pulse on line 107. As a result, each sampling interval during which the amplitude word and address word for a particular sample appear on buses 122 and 106, respectively, is divided into three subintervals. These subintervals are referred to hereinbelow as a first subinterval equal to the period of time between the rise of the pulse on line 107 in pulse train Φ and the rise of the pulse on line 351 in pulse train $\Phi_1$: a second subinterval equal to the period of time between the rise of the pulse on line 351 and the rise of the pulse on line 352 in pulse train $\Phi_2$: and finally, a third subinterval equal to the period of time between the rise of the pulse on line 352 and the rise of the next pulse in pulse train Φ on line 107.

The transmit signal on line 119, if present, is present for the entire duration of the sampling interval. This transmit signal is connected to an input of an AND gate 304 and an inhibit input of an AND gate 305. The other two inputs of both AND gates 304 and 305 are energized by the energizing pulse on line 352. AND gate 304, when energized, causes a flip-flop 306 to be set. When AND gate 305 is energized, flip-flop 306 is cleared. Accordingly, flip-flop 306 is either set or cleared by the pulse in pulse train $\Phi_2$ depending on whether or not a transmit signal is present on line 119. If the transmit signal is present, flip-flop 306 is set during the third subinterval, whereas if the transmit signal is not present, flip-flop 306 is cleared during the third subinterval of a sampling period.

The transmit signal on line 119 is also connected to an input of each of two AND gates 307 and 308 and is also connected to the inhibit input of an AND gate 309. The logical 1 output from flip-flop 306 which provides an energizing signal when flip-flop 36 is in its set state, is connected to an inhibit input of AND gate 307 and to an input of each of the AND gates 308 and 309. Each of the AND gates 307, 308 and 309 have a third input connected to the output of delay circuit 302 to receive the energizing pulse in pulse train $\Phi_1$.

If a transmit signal is not present on line 119 during a sampling interval, the energizing pulse on line 352 will clear flip-flop 306 during the third timing subinterval. If then a transmit signal is present on line 119 during the next sampling interval AND gate 307 will be energized by the pulse in pulse train $\Phi_1$ on line 351 during the second timing subinterval. During this second subinterval, the transmit signal on line 119 has not yet been effective in setting flip-flop 306 since the flip-flop is set or cleared only during the third subinterval when the pulse is present in pulse train $\Phi_2$. Accordingly, an energizing signal from the logical 1 output of flip-flop 306 is not present during this second timing subinterval and therefore AND gate 308 is not energized. AND gate 309 is also not energized since it is inhibited by the presence of the transmit signal on line 119. As a result, the presence of a transmit signal on line 119 following a sampling period during which no such transmit signal was present causes AND gate 307 to be energized and produce an energizing signal on line 361, designated in the drawings by the letters SR to indicate a start-of-run.

During the third timing subinterval of the sampling period when a transmit signal first appears on line 119, flip-flop 306 will be set by the pulse in pulse train $\Phi_2$. The energizing signal produced at this time at the logical 1 output of flip-flop 306 will have no immediate effect on AND gates 307 through 309 since they are only energized during the second timing subinterval.

If a transmit signal appears on line 119 following a sampling period during which a transmit signal had been present on line 119, AND gate 308 will be energized during the second timing interval by the pulse in pulse train $\Phi_1$. The energizing signal produced at the output of AND gate 308 on line 362 is designated in the drawings by the letters CR to indicate a continuing run. AND gates 307 and 309 will not be energized during this sampling period since the energizing signal from flip-flop 306 inhibits AND gate 307 and the transmit signal on line 119 inhibits AND gate 309. During this second sampling period when the transmit signal is present on line 119, flip-flop 306 however will again be set during the third timing subinterval by the pulse in pulse train $\Phi_2$. Accordingly, AND gate 308 will continue to produce continuing run signals on line 362 (designated as CR in FIG. 3) for succeeding sampling periods as long as transmit signals continue to be present on line 119.

When a sampling period occurs during which a transmit signal is no longer present on line 119, AND gate 309 is energized by the pulse in pulse train $\Phi_1$ during the second timing subinterval to produce an energizing signal on line 363 which is designated in the drawings by the letters ER to indicate an end-of-run. AND gates 307 and 308 will not be energized during this sampling period since the logical 1 output from flip-flop 306 will still inhibit AND gate 307 during the second timing subinterval and AND gate 308 will not be energized since the transmit signal is no longer present on line 119.

In summary, the first appearance of a transmit signal on line 119 will cause a start-of-run signal to appear on line 361. If the transmit signal continues to be present in succeeding sampling periods, a continuing run signal is produced on line 362 during each of these succeeding sampling periods. An end-of-run signal is produced on line 363 during the first sampling period when the transmit signal is no longer present on line 119.

The appearance of a start-of-run signal on line 361 causes the control inputs of two transmission gates 310 and 312 to be energized. With transmission gate 310 energized the amplitude word on bus 122 is coupled through gate 310 and written into the first cell of a shift register 321. Each cell of shift register 321 is actually constructed of several stages in parallel each one of which is capable of storing one bit of the word said to be entered into the cell. The appearance of an energizing pulse from OR gate 320 at the shift input of shift register 321 causes the word stored in the stages making up the first cell to be shifted into the stages making up the second cell.

With transmission gate 312 energized, the address word on bus 106 is coupled through gate 312 by way of bus 366 to the input of an OR circuit 315. OR circuit 315 is actually constructed of a plurality of OR gates one for each of the bit positions in the words provided by the buses to the input of OR circuit 315. Each one of the OR gates has inputs equal in number to the number of inputs of OR circuit 315. The inputs of each OR gate are connected to the bit position corresponding to that OR gate in all of the digital words connected to the inputs of OR circuit 315. The address word provided on bus 366 is coupled by OR circuit 315 into the second cell of the two-cell shift register 321. Consequently, appearance of a start-of-run signal on line 361 causes the amplitude and address words corresponding to that transmit signal to be written into the first and second cells respectively of shift register 321.

The energizing pulse on line 361 which indicates a start-of-run is also coupled through a delay circuit 316 and then through OR circuit 320 to the control input of a transmission gate 322 and also to the shift input of shift register 321. An energizing pulse on the control input of gate 322 causes the digital word stored in the second cell of shift register 321 to be coupled through gate 322 by way of bus 208 to buffer memory 204 in FIG. 2. The energizing pulse from OR gate 320 also causes the digital words stored in the first cell of shift register 321 to be shifted into the second cell of shift register 321. Due to the inherent delay in the operation of the shift register, the coupling out of the second cell by way of gate 322 occurs before the information is coupled from the first cell into the second cell thereby causing a destruction of the information previously stored in the second cell.

The energizing pulse out of delay circuit 316 is also coupled through a delay circuit 317 to a second input of OR gate 320. This second energizing pulse provided at the output of delay circuit 317 causes the digital word now stored in the second cell of shift register 321 to be coupled by way of gate 322 to buffer memory 204, leaving the shift register empty of all information.

During the next sampling period when the next energizing pulse appears on line 107 and new amplitude and address words appear on bus 122 and 106, respectively, another transmit signal on line 119 will no longer cause AND gate 307 to be energized since its inhibit input is energized by the 1 output of flip-fiop 306. Instead the energizing pulse on line 351 causes AND gate 308 to be energized thereby producing an energizing pulse on line 362 which indicates that the run of samples to be transmitted is continuing. This energizing pulse on line 362 energizes the control input of a transmission gate 311. With gate 311 energized the amplitude word on bus 122 is coupled through gate 311 by way of bus 365 to an input of OR circuit 315. From OR circuit 315 the amplitude word is coupled to and written into the second cell of shift register 321. The energizing pulse on line 362 is also coupled through an OR gate 318 into a delay circuit 319. Out of delay circuit 319 the energizing pulse is coupled through OR gate 320 to the control input of gate 322 and also to the shift input of shift register 321. Accordingly, the amplitude word stored in the second cell of shift register 321 by way of gate 311 is read out of the shift register through gate 322 to the buffer memory. The appearance of any further amplitude words which correspond to significant changes will cause a similar operation of the group word assembler shown in FIG. 3, that is, these amplitude words will be coupled to and written into the second cell of shift register 321 and then read out through gate 322 to the buffer memory 204 in FIG. 2.

When the first sample appears which does not require transmission, the absence of an energizing signal on line 119 causes the inhibit input of AND gate 309 to be energized. A second input of AND gate 309 is already energized by the 1 output of flip-flop 306 which has been previously set during the last sample interval by AND gate 304. Consequently, when the energizing pulse in pulse train $_1$ appears on line 351, the third input of AND gate 309 is energized thereby causing AND gate 309 to provide an energizing pulse on line 363 indicating that the run of samples to be transmitted has ended. This energizing pulse on line 363 energizes the control input of a transmission gate 314**.

The flag word generator 213 provides a digital word on bus 267 to the input of gate 314. As pointed out hereinabove, this flag word produced by generator 213 has the same number of bits as an amplitude word which appears on bus 122 but is distinguishable therefrom in that the word produced by generator 213 has a value which is prohibited from appearing as an amplitude value on bus 122. Hence, when the end-of-run signal occurs on line 363, the flag word from generator 213 is coupled through gate 314 and through OR circuit 315 into the second cell of shift register 321.

In addition to energizing the control input of gate 314 the energizing pulse on line 363 is also coupled through OR gate 318 to the input of delay circuit 319. Out of delay circuit 319 this energizing pulse is coupled through OR gate 320 to the control input of transmission gate 322 and also to the shift input of shift register 321. Accordingly, the flag word which has been inserted into the second cell of shift register 321 is coupled out of this cell through gate 322 via bus 208 to the buffer memory.

In summary, the first sample selected to be transmitted causes a start-of-run pulse to be generated by gate 307 which in turn results in loading the amplitude word and address word corresponding to that sample into shift register 321. After intervals corresponding to the time delay of circuits 316 and 317 and before the appearance of another sample this amplitude word and address word are coupled from the shift register into the buffer memory. If the next sample has also been selected for transmission, a continuing run pulse is generated thereby indicating that the run of samples to be transmitted is continuing. This continuing run pulse from AND gate 308 causes only the amplitude word from this second sample to be loaded into the second cell of shift register 321. After a duration corresponding to the time delay in delay circuit 319, this amplitude word for the second sample is read out of shift register 321 into the buffer memory. Finally, when a sample occurs which has not been selected for transmission, an end-of-run pulse is generated by AND gate 309 thereby causing a flag word to be read out of generator 213 into the second cell of shift register 321. After an interval equal in duration to the delay of circuit 319, this flag word is read out of the shift register through gate 322 into the buffer memory.

During the horizontal blanking intervals the sync word present on bus 203 is coupled to an input of OR circuit 315. A sync word detector 301 whose input is connected to bus 203 detects the presence of the sync word and in response thereto provides an energizing pulse on line 368 to an input of OR gate 318. From OR circuit 315 the sync word is coupled into the second cell of shift register 321. The energizing pulse on line 368 is coupled through OR gate 318 to the input of the delay circuit 319. After an interval equal in duration to the delay of circuit 319, this energizing pulse is then coupled through OR gate 320 to the control input of transmission gate 322 and to the shift input of shift register 321. Accordingly, the sync word is read out of the second cell of shift register 321 through gate 322 to the buffer memory. Since this sync word is caused to occur during each horizontal blanking interval, the address word on bus 106 need only indicate the location of the amplitude word on bus 122 within a single video line. In order to insure proper synchronization of the receiving terminal the sync word provided on bus 203 during the vertical blanking interval can be caused to be different from the sync word normally provided during the horizontal blanking intervals. In this way synchronization of the receiving terminal to the first line of video is properly insured.

What has been described hereinabove is a specific illustrative embodiment of the present invention. Numerous modifications may be made by those skilled in the art without departing from the spirit and scope of the present invention.

I claim:

1. In a redundancy reduction system in which plural samples of a signal amplitude are taken during each successive time interval, means for generating an address for each sample which identifies the location of said each sample within its respective time interval, means for generating a signal which identifies selected samples, means for generating a flag word which can be distinguished from sample amplitude values, and means for transmitting in sequence the address and amplitude of a selected sample, the amplitude of all selected samples whose addresses follow the transmitted address, followed by said flag word to indicate the end of a run of selected samples.

2. In a redundancy reduction system of the type defined in claim 1 wherein said address generating means provides an energizing pulse with each generated address and said means for transmitting in sequence includes a means having a first, a second and a third output, said last-mentioned means being responsive to both said signal which identifies selected samples and said energizing pulse for generating a start-of-run signal at said first output when a selected sample follows a sample not selected, a continuing run signal at said second output when a selected sample follows a selected sample, and an end-of-run signal at said third output when a sample not selected follows a selected sample.

3. In a redundancy reduction system as defined in claim 2 wherein said means for transmitting in sequence further includes a shift register having a first and a second cell, a first and a second transmission gating means responsive to said start-of-run signal for coupling the amplitude and address of a sample into the first and second cells of said shift register, third gating means responsive to said continuing run signal for coupling the amplitude of a sample into the second cell of said shift register, and fourth gating means responsive to said end-of-run signal for coupling said flag word into the second cell of said shift register, and means responsive to said start-of-run signal, said continuing run signal or said end-of-run signal for shifting information out of said shift register a predetermined interval after information has been entered.

4. In a redundancy reduction system as defined in claim 2 wherein said means for generating the start-of-run signal, the continuing run signal and the end-of-run signal includes a first delay means for generating a first delayed pulse in response to said energizing pulse, a second delay means for generating a second delayed pulse in response to said first delayed pulse, a flip-flop having a set and a cleared state, means responsive to said identifying signal and said second delayed pulse for setting said flip-flop, means responsive to the absence of said identifying signal and said second delayed pulse for clearing said flip-flop, a first AND gating means for developing said start-of-run signal in response to the simultaneous presence of said identifying signal, the first delayed pulse and the cleared state of said flip-flop, a second AND gating means for developing a continuing run signal in response to the simultaneous presence of said identifying signal, said first delayed pulse and the set state of said flip-flop, and a third AND gating means for developing an end-of-run signal in response to the absence of said identifying signal, the set state of said flip-flop and said first delayed pulse.

5. Redundancy reduction transmitting apparatus comprising means for generating a plurality of amplitude samples during each predetermined interval of an input signal, means for generating an address word for each amplitude sample which word indicates the relative position of its respective sample in the predetermined interval of said input signal, means for selecting amplitude samples for transmission, each selected sample being identified by the presence of an energizing signal, means for generating a flag word whose value is distinguishable from all amplitude samples, and means responsive to said energizing signal for transmitting in sequence the address and amplitude of a selected sample, the amplitude of selected samples whose addresses follow the transmitted address, and said flag word.

6. Redundancy reduction transmitting apparatus as defined in claim 5 wherein the input signal is a video signal having time intervals called frames and time subintervals called lines and said means for selecting amplitude samples for transmission includes a memory means for storing an entire frame of video samples, a subtractor circuit for taking the difference between the amplitude of each new sample and its corresponding sample in said memory means having the same time position in the frame interval, and means for generating an energizing signal if the difference exceeds a predetermined threshold.

7. Redundancy reduction transmitting apparatus as defined in claim 6 wherein said means for transmitting in sequence includes a first gating means for generating a start-of-run signal when a selected sample follows a nonselected sample, a second gating means for generating a continuing run signal when a selected sample follows a selected sample, and a third gating means for generating an end-of-run signal when a nonselected sample follows a selected sample.

8. Redundancy reduction transmitting apparatus as defined in claim 7 wherein said means for transmitting in sequence further includes a shift register having at least a first and a second cell, a first and a second transmission gate for coupling the amplitude and address of a selected sample into said first and second cells of said shift register in response to said start-of-run signal, a third transmission gate for coupling the amplitude of a selected sample into said second cell in response to said continuing run signal, and a fourth transmission gate for coupling said flag word into said second cell in response to said end-of-end signal.